United States Patent [19]

Nakatsukasa et al.

[11] Patent Number: 4,747,982

[45] Date of Patent: May 31, 1988

[54] METHOD FOR ADJUSTING COMPRESSION STROKE ALLOWANCE OF VERTICAL INJECTION-COMPRESSION MOLDING MACHINE

[75] Inventors: Susumu Nakatsukasa, Kobe; Yoshifumi Mukai, Nishinomiya; Hiroaki Kondo, Kobe; Naoki Takeuchi, Kobe; Masanobu Kurumaji, Kobe; Hiroshi Ueda, Kobe; Tsutomu Sano, Kobe, all of Japan

[73] Assignee: Kabushiki Kaisha Kobe Seiko Sho, Kobe, Japan

[21] Appl. No.: 4,488

[22] Filed: Jan. 20, 1987

[30] Foreign Application Priority Data

Mar. 3, 1986 [JP] Japan ................................ 61-46957

[51] Int. Cl.$^4$ .................... B29C 43/04; B29C 45/04; B29C 45/67
[52] U.S. Cl. .................................. 264/40.5; 425/451; 425/451.9; 425/589
[58] Field of Search ............... 264/40.5; 425/451, 589, 425/451.9, 595

[56] References Cited

U.S. PATENT DOCUMENTS 4,519,763  5/1985  Matsuda et al. ................. 425/451.2

Primary Examiner—Jan H. Silbaugh
Assistant Examiner—James Bartholomew
Attorney, Agent, or Firm—Oblon, Fisher, Spivak, McClelland & Maier

[57] ABSTRACT

Method for adjusting the compression stroke allowance of a vertical injection-compression molding machine including a slide plate mounting thereon a mold clamp cylinder and an upper mold in opposition to a lower mold on a machine bed, and a lift cylinder for moving the slide plate up and down along tie bars, the method including the steps of: downwardly extending a piston rod of a hydraulic cylinder connected to the slide plate to a stroke end: upwardly extending a piston rod of an air cylinder connected to the bed thereof, with the upper and lower molds in contact with each other, until a micrometer at the upper end of the air cylinder piston rod abuts the lower end of the hydraulic cylinder piston rod; fixing the air cylinder piston rod in this state; upwardly retracting the hydraulic cylinder piston rod; setting the micrometer at a desired compression stroke allowance; lowering the hydraulic cylinder piston rod to the stroke end thereof; and lifting the slide plate so as to allow for injection-compression molding operation.

1 Claim, 3 Drawing Sheets

F I G. 2
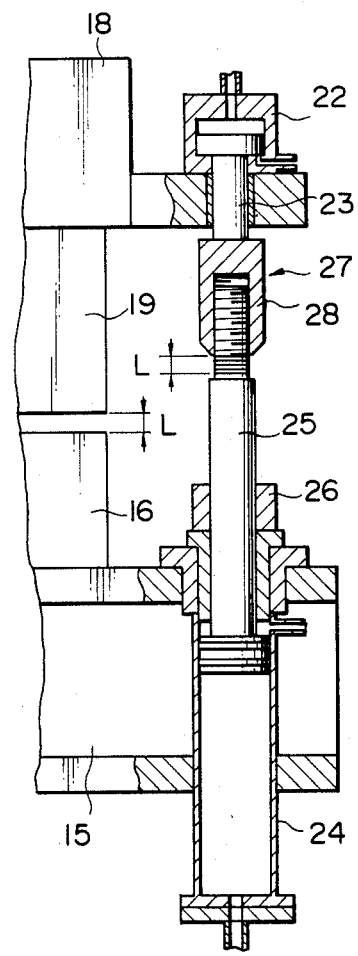
F I G. 3
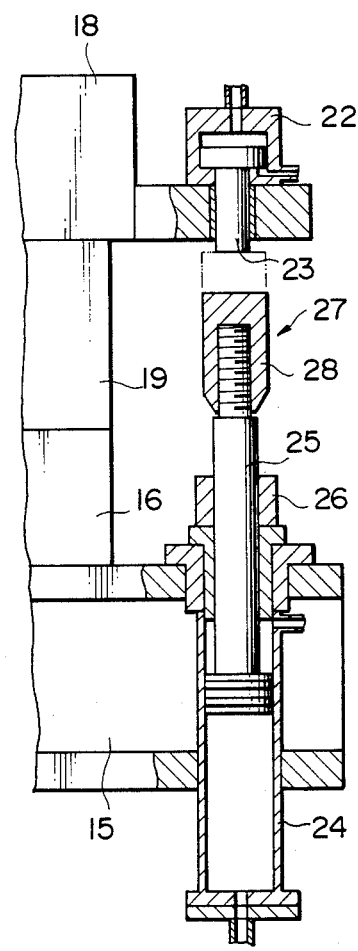

METHOD FOR ADJUSTING COMPRESSION STROKE ALLOWANCE OF VERTICAL INJECTION-COMPRESSION MOLDING MACHINE

BACKGROUND OF THE INVENTION

1. Field of the Invention

This invention relates to a method for adjusting the compression stroke allowance of a vertical injection-compression molding machine.

2. Description of the Prior Art

In the molding operation by an injection-compression molding machine, it is important to maintain an allowance for a compression stroke while clamping molds for injection thereinto of a resin. With regard to such a mold clamping method, Japanese Laid-Open Patent Application No. 57-96833 proposes clamp mechanisms as shown in FIGS. 4 and 5 of the present application.

In FIG. 4, indicated at 1 is a fixed die plate, at 2 a movable die plate, at 3 tie bars, at 4 a tie bar mounting block, at 5 a fixed mold, at 6 a movable mold, at 7 a mold clamp cylinder, and at 8 a stopper.

The molds 5 and 6 are clamped by the cylinder 7, driving the movable die plate 2 to the position indicated by solid line. For adjusting the compression stroke allowance δ, a desired length is measured with a scale and the stopper 8 is fixed at the distance δ from the solid line position. Thereafter, the movable die plate 2 is retracted until it abuts against the stopper 8 by operating the mold clamp cylinder 7. In this state, a resin material is injected and filled in the molds 5 and 6.

In the case of the arrangement shown in FIG. 5, a stopper 11, which determines the foremost advanced position of a piston 10, is provided in a hydraulic cylinder 9. In that position, a spacer 12 of a suitable thickness is fixed to the piston 10 of the cylinder 9 through a stopper end 13 to retain a compression stroke allowance δ.

Thus, the conventional machines require troublesome and inefficient work for adjusting the allowance for the compression stroke, either determining the position of a stopper according to measurement with a scale or determining the position of a stopper end by selecting a spacer of a suitable thickness each time the allowance is to be changed.

SUMMARY OF THE INVENTION

It is therefore an object of the present invention to provide a method for adjusting the allowance for the compression stroke of the injection-compression molding machine, which can overcome the above-mentioned problems or drawbacks.

In accordance with the present invention, there is provided a method for adjusting the allowance for the compression stroke of a vertical injection-compression molding machine including a slide plate supporting thereon a mold clamp cylinder and an upper mold vertically in opposition to a lower mold on a bed, and a lift cylinder for moving the slide plate up and down along tie bars, the method comprising the steps of downwardly extending a piston rod of a hydraulic cylinder on the slide plate to stroke end; upwardly extending a piston rod of an air cylinder on the bed, with the upper and lower molds in contact with each other, until a micrometer at the upper end of the air cylinder piston rod is abutted against the lower end of the piston rod of the hydraulic cylinder; fixing the air cylinder piston rod in this state; retracting the hydraulic cylinder piston rod upwardly; setting the micrometer at a desired compression stroke allowance; lowering the hydraulic cylinder piston rod to the stroke end; and lifting up the slide plate so as to proceed to an injection-compression molding operation.

The above and other objects, features and advantages of the invention will become more apparent from the following description and the appended claims, taken in conjunction with the accompanying drawings which show by way of example a preferred embodiment of the invention.

BRIEF DESCRIPTION OF THE DRAWINGS

In the accompanying drawings:

FIG. 2 is a partly cutaway view of major components of the compression stroke allowance adjusting mechanism;

FIG. 3 is a view similar to FIG. 2 but showing the components in a different phase of the adjusting operation;

DESCRIPTION OF PREFERRED EMBODIMENT

Figure 1:
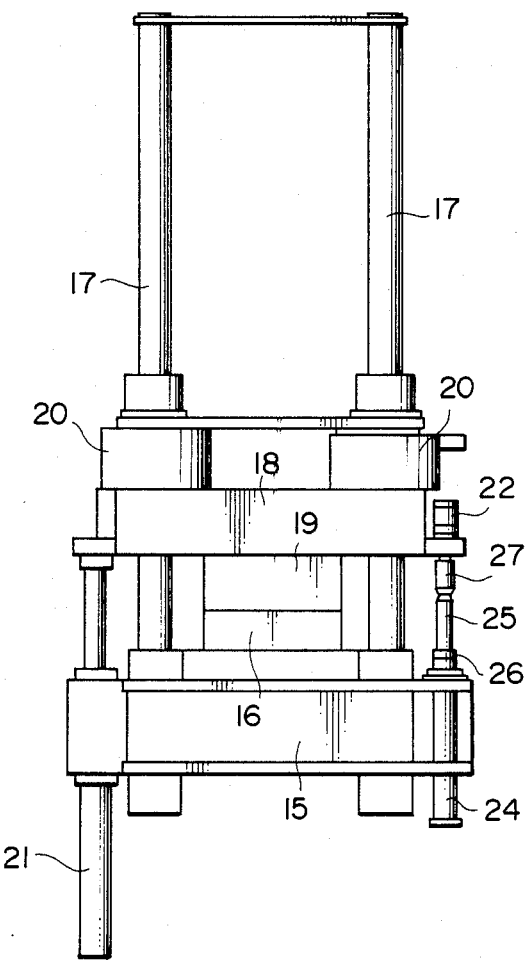
FIG. 1 is a schematic front view of a vertical type injection-compression molding machine incorporating a compression stroke allowance adjusting mechanism according to the present invention.
Figure 4:
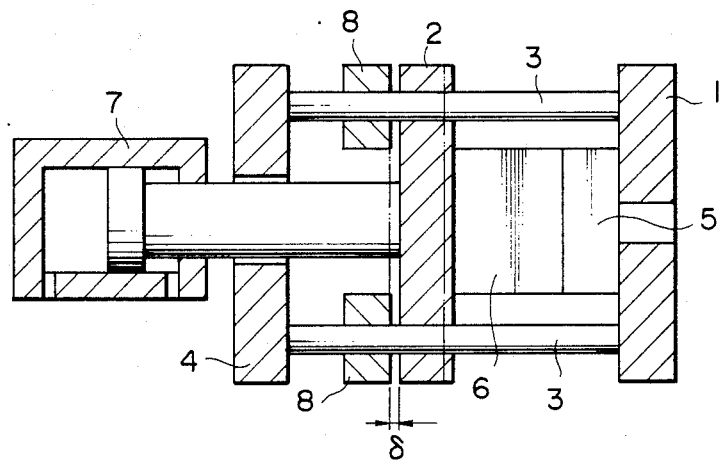
FIG. 4 is a schematic sectional view of a conventional arrangement.
Figure 5:
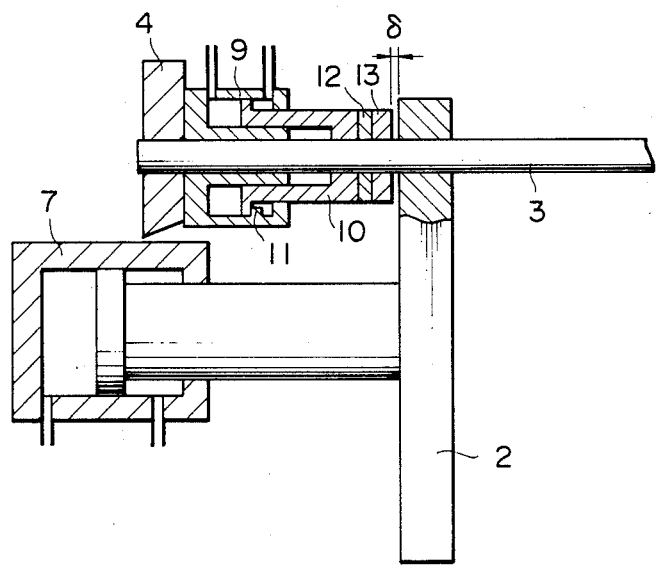
FIG. 5 is a schematic sectional view of another conventional arrangement.

Hereafter, the invention is described more particularly by way of a preferred embodiment shown in the drawings. Referring to FIGS. 1 and 2, there is shown a vertical type injection-compression molding machine incorporating a compression stroke allowance adjusting mechanism according to the invention, in which indicated at 15 is a bed of the machine mounting thereon a lower mold 16. Denoted at 17 are tie bars, and at 18 is a slide plate which is movable up and down along the tie bars 17 and which supports thereon an upper mold 19 and a mold clamp cylinder 20. Reference numeral 21 indicates a lift cylinder for moving the slide plate 18 up and down. Denoted at 22 is a hydraulic cylinder which is mounted on the slide plate 18 with its piston rod 23 on the lower side. By reference numeral 24 is denoted an air cylinder which is mounted on the base 15 with its piston rod 25 on the upper side, and at 26 is a lock nut for fixing the piston rod 25. Indicated by reference numeral 27 is a micrometer which has its micrometer head 28 threaded on the upper end of the piston rod 25.

With the foregoing arrangement, the molds are clamped in the following manner. In the first place, the piston rod 23 of the hydraulic cylinder 22 is extended downwardly to the stroke end thereof, and the slide plate 18 is lowered along the tie bars 17 by means of the lift cylinder 21, contacting the upper and lower molds with each other as shown in FIG. 3. Next, after registering the calibration of the microhead 28 of the micrometer 27 on the zero point, the air cylinder 24 is extended, raising its piston rod 25 until the micrometer head 28 is abutted against the piston rod 23 of the hydraulic cylinder 22. In this state, the piston rod 25 is fixed by tightening the lock nut 26.

Then, the piston rod 23 of the hydraulic cylinder 22 is retracted to the stroke end, and the micrometer head 28 is turned from the zero point to a graduation of a desired compression stroke allowance L.

After adjusting the compression stroke allowance L in this manner, the slide plate 18 is raised by operating the lift cylinder 21 so as to proceed to an actual molding operation. In this case, the slide plate 18 is lowered by the lift cylinder 21 to bring the upper and lower molds 19 and 16 into contact with each other, and then the piston rod 23 of the hydraulic cylinder 22 is extended to the stroke end, whereupon, the piston rod 23 is abutted against the micrometer head 28, and the slide plate 18 is lifted up by a distance corresponding to the value specified by the micrometer head, namely, to the compression stroke allowance L, setting apart the upper and lower molds 19 and 16 by a distance corresponding to the compression stroke allowance L. After this, the operation proceeds to the injecting phase, and, upon completion of injection, the mold clamp cylinder 20 is actuated to clamp the molds.

According to the method of the invention, the desired compression stroke allowance L is determined via the micrometer 27, so that the molding machine can be adjusted to an arbitrary compression stroke allowance L easily and accurately without requiring replacement of parts. In addition, the use of stroke end of the hydraulic cylinder ensures high accuracy with repeated adjustments. Further, the adjustment which is necessitated by a change in the mold thickness can be made easily since the load of adjustment is supported by the air force of the air cylinder 24.

Obviously, numerous modifications and variations of the present invention are possible in light of the above teachings. It is therefore to be understood that within the scope of the appended claims, the invention may be practiced otherwise than as specifically described herein.

What is claimed is:

1. A method for adjusting the compression stroke allowance of a vertical injection-compression molding machine having a slide plate mounting thereon a mold clamp cylinder and an upper mold vertically in opposition to a lower mold on a bed, a lift cylinder for moving the slide plate up and down along a plurality of tie bars, a hydraulic cylinder connected to said slide plate and having a piston rod and an air cylinder connected to said bed and having a piston rod, wherein said method comprises the steps of:

positioning a micrometer at an upper end of said piston rod of said air cylinder supplying hydraulic fluid to said hydraulic cylinder so as to downwardly extend said piston rod of said hydraulic cylinder to a stroke end thereof;

moving said upper and lower molds into contact with each other;

supplying air pressure to said air cylinder so as to upwardly extend said piston rod of said air cylinder until said micrometer abuts a lower end of said piston rod of said hydraulic cylinder;

fixing said piston rod of said air cylinder in position;

retracting said piston rod of said hydraulic cylinder and setting said micrometer at a desired compression stroke allowance; and returning said piston rod of said hydraulic cylinder to said stroke end thereof; and thereby lifting up said slide plate so as to allow for injection-compression molding operation.

* * * * *